(12) United States Patent
Lin et al.

(10) Patent No.: US 10,372,948 B2
(45) Date of Patent: Aug. 6, 2019

(54) SCRAMBLING APPARATUS AND METHOD THEREOF

(71) Applicant: TAIWAN SEMICONDUCTOR MANUFACTURING COMPANY LTD., Hsinchu (TW)

(72) Inventors: Kai-Chun Lin, Hsinchu (TW); Ku-Feng Lin, New Taipei (TW); Hung-Chang Yu, Hsinchu (TW); Yu-Der Chih, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 13 days.

(21) Appl. No.: 14/969,621

(22) Filed: Dec. 15, 2015

(65) Prior Publication Data

US 2017/0169255 A1 Jun. 15, 2017

(51) Int. Cl.
*G06F 21/79* (2013.01)
*G06F 12/14* (2006.01)

(52) U.S. Cl.
CPC .............. *G06F 21/79* (2013.01); *G06F 12/14* (2013.01); *G06F 12/1408* (2013.01); *G06F 2211/007* (2013.01); *G06F 2212/1052* (2013.01)

(58) Field of Classification Search
CPC ..... G11C 7/1006; G11C 7/1012; G06F 12/00; G06F 12/14; G06F 12/1408; G06F 21/79; G06F 2211/007; G06F 2212/1008
See application file for complete search history.

(56) References Cited

U.S. PATENT DOCUMENTS

| | | | | |
|---|---|---|---|---|
| 2005/0008151 | A1* | 1/2005 | Liang | G06F 21/79 380/37 |
| 2008/0152142 | A1* | 6/2008 | Buer | G06F 12/1408 380/270 |
| 2009/0067625 | A1* | 3/2009 | Patel | H04L 9/0656 380/201 |
| 2009/0113217 | A1* | 4/2009 | Dolgunov | G06F 12/1408 713/190 |
| 2009/0316490 | A1* | 12/2009 | Takada | G11C 7/1006 365/185.26 |
| 2014/0310534 | A1* | 10/2014 | Gurgi | G06F 12/1408 713/193 |
| 2015/0033037 | A1* | 1/2015 | Lidman | G06F 12/1408 713/193 |
| 2016/0080148 | A1* | 3/2016 | Kawarasaki | G06F 21/62 713/193 |
| 2016/0179384 | A1* | 6/2016 | Kim | G06F 3/0623 711/154 |
| 2016/0203328 | A1* | 7/2016 | Sawada | G06F 21/85 726/26 |
| 2016/0284411 | A1* | 9/2016 | Sudo | G11C 16/10 |
| 2017/0090764 | A1* | 3/2017 | Lien | G11C 7/1006 |
| 2017/0147509 | A1* | 5/2017 | Nevers | G06F 12/1009 |
| 2017/0287366 | A1* | 10/2017 | Boscher | G09C 1/00 |

* cited by examiner

*Primary Examiner* — Nelson Giddins
(74) *Attorney, Agent, or Firm* — WPAT, P.C., Intellectual Property Attorneys; Anthony King

(57) ABSTRACT

A memory device is provided which comprises a memory array, a first scrambling circuit and a second scrambling circuit. The first scrambling circuit is configured to provide first scrambled data with a first scrambling pattern in response to input data. The second scrambling circuit is configured to provide second scrambled data with a second scrambling pattern in response to the first scrambled data.

20 Claims, 6 Drawing Sheets

SCRAMBLING APPARATUS AND METHOD THEREOF

BACKGROUND

Memory is indispensable for most modern electronic equipment, such as computers, personal digital assistants, cellular telephones and digital cameras. A memory device is widely used to retain computer programs or video/audio data. Furthermore, many applications require data to be stored in a non-volatile medium in order to fulfill the goal of portability. An example of non-volatile memory devices is flash memory, which is capable of retaining data when power is turned off. Flash memory is more competitive than conventional compact disks or magnetic-type recording media due to its light weight, superior recoding density, small form factor and shrinking cost. Flash memory has found many applications in the area of sensitive data access such as personal identity cards, healthcare cards, credit cards and electric wallets, and has widely replaced conventional paper or magnetic cards. However, there are still concerns in data protection for electronic cards. Hence, it may be desirable to strengthen the security measures for such non-volatile memory.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
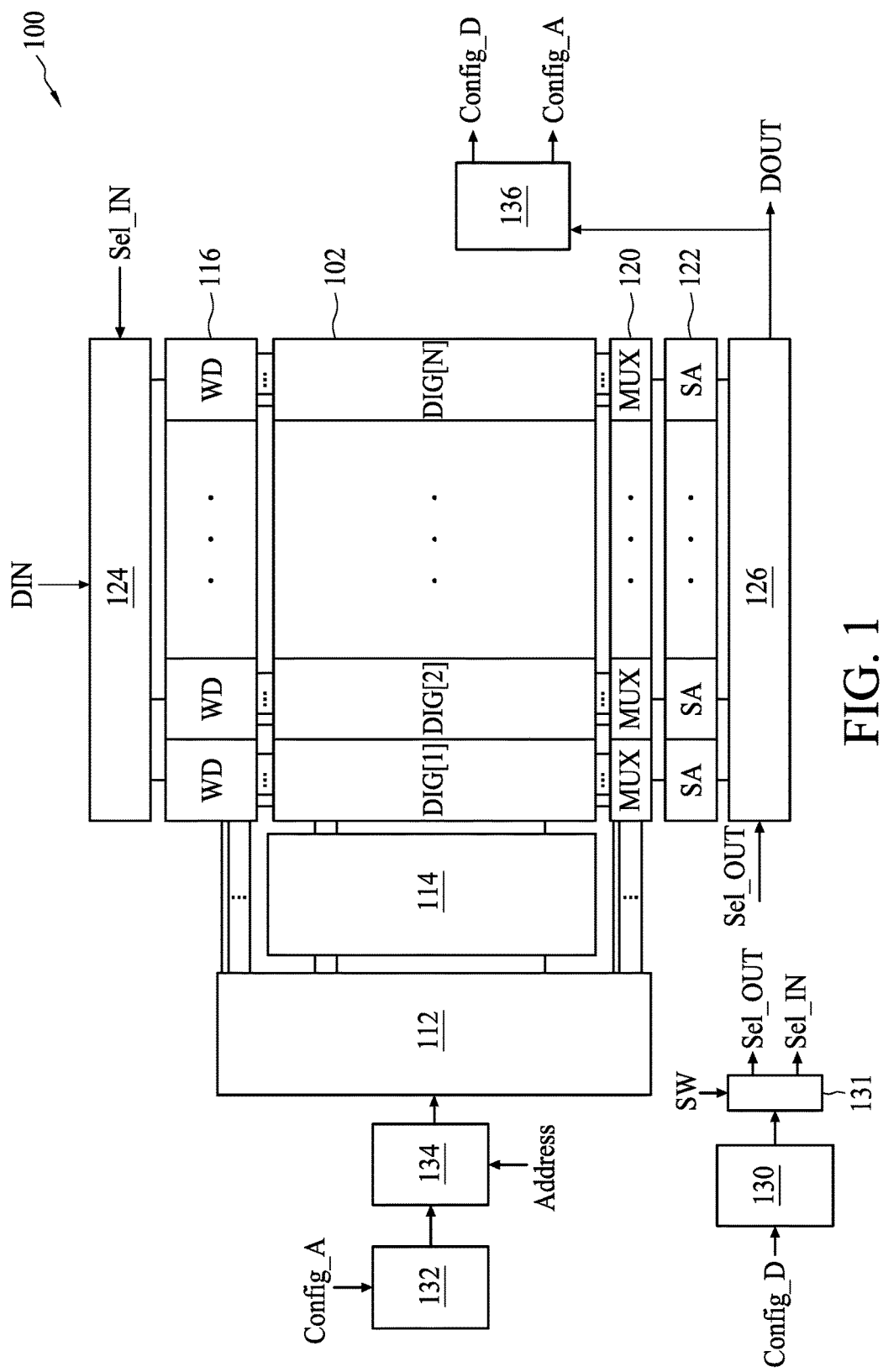
FIG. 1 is a schematic diagram of a memory device in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic diagram of a memory device 100 in accordance with some embodiments. Memory device 100 includes one or more memory arrays, in which an exemplary memory array 102 is shown for illustration purpose. In addition, memory device 100 includes an address decoder 112, a word line (WL) driver 114, a plurality of write drivers (WD) 116, a plurality of sense amplifiers (SA) 122, a plurality of read multiplexers (MUX) 120, a data pattern generation circuit 130, an address pattern generation circuit 132, a write scrambling circuit 124, a read scrambling circuit 126, and an address scrambling circuit 134.

Memory array 102 includes a plurality of memory cells (not separately shown) arranged in rows and columns, where each row and each column correspond to a word line and a bit line, respectively. Each memory cell is addressed and accessed by its respective word line and bit line. An access operation may refer to a write operation to write data into memory array 102 or refer to a read operation to read data from memory array 102. In addition, memory array 102 is partitioned into multiple data input/output groups DIG[1] to DIG[N] each corresponding to a respective write driver 116, where N is a nature number. During operation, a data block DIO in memory array 102 is accessed with each constituent bit DIO[i], i being a natural number between 1 and N, stored in one cell of a corresponding one of memory groups DIG[1] to DIG[N].

Address decoder 112 is configured to provide a physical word line address signal in response to a logical address signal from address scrambling circuit 134 or an external controller (e.g., a memory controller). The decoded word line address is represented by k bits, in which m bits are used to select a corresponding one of the word lines through word line driver 114, and the remaining p (=k−m) bits are used to select a corresponding one of the bit lines in the memory array 102 through write drivers 116 or read multiplexers 120. Word line driver 114 receives the decoded word line address from address decoder 112, and is configured to drive a selected word line, associated with a row of memory array 102, with a driving voltage for enabling a write or read operation. In addition, word line driver 114 may include transistors configured to enable or disable a selected word line. Also, each row of word line driver 114 is responsible for driving the memory cells on the same row, and the driving capacity of word line driver 114 determines the number of memory cells in a row.

Write drivers 116 receive serial input data DIN through write scrambling circuit 124. Each write driver 116 comprises an input port, and an output port with p bit lines controlled by address signals from address decoder 112. During a write operation within a write cycle, a data block DIB (shown in FIG. 2A) having a length of N, equal to the number of write drivers 116, is written. Each of the N write drivers 116 receives a one-bit data during a write cycle and is configured to enable one of the p bit lines that is selected by address decoder 112. Then, each write driver 116 writes the received one-bit data into a corresponding memory cell with a bit line program or erase voltage. The other p–1 unselected bit lines are disabled by the write drivers 116 to ensure a proper write operation.

A plurality of read multiplexers 120 are disposed between memory array 102 and sense amplifiers 122. Each read multiplexer 120 is configured to select one of p bit lines in response to the decoded address provided by address decoder 112. Analogous to a write operation, N bits of data are read by corresponding read multiplexers 120 during a read operation. The read out data is provided to sense amplifiers 122 even though the received data bits are not yet detected thereby.

Sense amplifiers 122 receive the outputs of read multiplexers 120 and are configured to detect the logic state of the data read from memory cells. In operation, a predetermined voltage is applied to the control gate of a memory cell. Subsequently, a current in response to the voltage change at the control gate is generated accordingly. In order to detect the logic state, sense amplifier 122 is configured to measure the current and then compare the measured current with a predetermined reference current. When the measured current is larger than the reference current, it is determined that a logic high data is acquired. That means the detected memory cell stores a logic high data. On the other hand, when the measured current is smaller than the reference current, sense amplifier 122 outputs a logic low data.

In some embodiments, sense amplifier 122 is configured to detect data bits by comparison of voltages. In that case, each bit is detected by sensing the voltage difference between a sensed voltage in response to the voltage change at the control gate of the memory cell and a predetermined reference voltage.

Data pattern generation circuit 130 is configured to generate a scrambling pattern in response to a data scrambling configuration Config_D. In addition, data pattern generation circuit 130 is configured to provide a plurality of scrambling patterns controlled by respective data scrambling configurations. The data scrambling configuration may comprise a scrambling code and optionally an index of data blocks for scrambling. For instance, a write scrambling configuration Sel_IN for a write operation may comprise a write scrambling code corresponding to a write scrambling pattern, and one or more block indices for input data DIN to be written. Similarly, a read scrambling configuration Sel_OUT for a read operation may comprise a read scrambling code corresponding to a read scrambling pattern, and one or more block indices of memory data DIO to be read out.

In an embodiment, data pattern generation circuit 130 includes a lookup table containing scrambling patterns for mapping between an original data and a scrambled data. In another embodiment, data pattern generation circuit 130 may be implemented by a linear feedback shift register in a feedback circuit. The linear feedback shift register is configured to serially provide scrambled output so that scrambling patterns are determined according to the configuration of the feedback circuit. As such, by choosing a different generator polynomial, which corresponds to selected taps of the feedback circuit connected to the respective bits of the linear feedback shift register, the scrambling patterns are determined.

In an embodiment, data pattern generation circuit 130 is controlled by a read/write switch 131 through a selection control SW and configured to generate a read or write scrambling pattern in response to an associated read or write scrambling configuration, respectively. Since a read operation is performed at a different time than a write operation, data pattern generation circuit 130 can serve both operations.

Address pattern generation circuit 132 is configured to generate a scrambling pattern for an address signal in response to an address scrambling configuration Config_A. Address pattern generation circuit 132 is similar in structure to data pattern generation circuit 130 and functions in the same way. In an embodiment, address pattern generation circuit 132 includes a lookup table containing scrambling patterns for mapping between an original address signal and a scrambled address. In another embodiment, address pattern generation circuit 132 may be implemented by a linear feedback shift register in a feedback circuit. In addition, address pattern generation circuit 132 is configured to provide a plurality of scrambling patterns controlled by a respective address scrambling configuration. The address scrambling configuration, for either a write or read operation, may comprise a scrambling code and optional information such as address ranges for scrambling.

Write scrambling circuit 124 is configured to provide memory data DIO for memory array 102 on a block basis in response to input data DIN. The size N of data blocks is set to be the scrambling size of write scrambling circuit 124. Furthermore, write scrambling circuit 124 is configured with a scrambling pattern determined by data pattern generation circuit 130. Similarly, read scrambling circuit 126 receives a read scrambling pattern from data pattern generation circuit 130 and is configured to scramble the memory data DIO read via sense amplifiers 122.

The memory data DIO in memory cell 102, when read out, is scrambled by read scrambling circuit 126 on a block basis, resulting in output data DOUT, which is then delivered to an external controller. Thus, read scrambling circuit 126 provides an additional scrambling to data scrambled by write scrambling circuit 124. In addition, candidate scrambling patterns for a write operation are different from those for a read operation. In such double scrambling mechanism, descrambling and recovery from input data DIN requires information on the write scrambling pattern provided by write scrambling circuit 124 and the read scrambling pattern provided by read scrambling circuit 126. With the read scrambling circuit 126, an unauthorized third party may find it difficult to access the memory data DIO even though the write scrambling configuration Sel_IN is hacked or stolen. In other words, an attempt to recover the stolen data would fail since the data is scrambled by both write scrambling circuit 124 and read scrambling circuit 126.

In an embodiment, the read scrambling configuration Sel_OUT is maintained at a different location from the write scrambling configuration Sel_IN. Hence, the risk of exposing both of the scrambling configurations to any malicious access is further decreased. In addition, a composite descrambling pattern of the write scrambling pattern and the read scrambling pattern can be provided separately for the purpose of descrambling input data DIN. In that case, it is not necessary to provide either the write scrambling configuration Sel_IN or read scrambling configuration Sel_OUT. The confidentiality of scrambling configurations is thus maintained.

Address scrambling circuit 134 is configured to provide a logical address signal by scrambling a sequential logical address signal based on an address scrambling pattern provided by address pattern generation circuit 132. The scrambled logical address is used for providing an address of memory array 102 in an access operation. As a result, row indices received at address decoder 112 may not follow the original sequence of the address signal at the input of address scrambling circuit 134. Address scrambling circuit 134 may be similar in structure to data pattern generator circuit 130, and can provide scrambling patterns in a granularity of a block size N. The input data DIN is thus scrambled on a row (data block) basis.

Scrambling depth refers to the degree of randomness in terms of the theoretically largest distance between locations of an unscrambled data bit and its scrambled counterpart. In the present case, the scrambling depth provided by write scrambling circuit 124 or read scrambling circuit 126 depends on the block size N of data blocks DIB. Specifically, scrambling depth increases as the block size N increases. In addition, data scrambled by incorporation of address scrambling in address scrambling circuit 134 may have an effective scrambling depth as the size of the whole memory array 102. Accordingly, a scrambled bit may appear in another row in the memory array 102. Therefore, incorporation of address scrambling with data scrambling performed by write scrambling circuit 124 or read scrambling circuit 126 adds more degree of randomness in input data DIN.

Thus, multiplexity in scrambling configurations, including the data scrambling configuration Config_D and the address scrambling configuration Config_A, facilitates a decrease in the risk of exposing scrambling patterns to others. Specifically, while information on the scrambling circuit is inevitably disclosed to a party who manufactures or tests the scrambling circuit of memory device 100, with the configurable scrambling patterns, an administrator or user of memory device 100 may use one of the scrambling configurations and subsequently change it to another one for a different application. Data security is enhanced accordingly.

Each of write scrambling circuit 124, read scrambling circuit 126 and address scrambling circuit 134 is configured to provide a scrambling pattern corresponding to a scrambling configuration. In addition, the scrambling patterns for write scrambling circuit 124, read scrambling circuit 126 and address scrambling circuit 134 may be different from each other. Further, the scrambling circuits 124, 126 and 134 in combination may produce a variety of possible scrambling results. In some embodiments, at least one but not all of the write scrambling circuit 124, read scrambling circuit 126 and address scrambling circuit 134 is disabled, and thus is transparent to the data or address signal. The scrambling circuits 124, 126 and 134 are different from some existing scrambling circuits that provide one scrambling pattern for the whole memory array 102 with fixed wired scramble connections. According to the embodiments of the present disclosure, the scrambling circuits 124, 126 and 134 provide variable scrambling results according to received scrambling configurations.

Storage unit 136 is disposed at the output of read scrambling circuit 126. In the beginning of an access operation, scrambling information, which comprises the scrambling configurations for write scrambling, read scrambling or address scrambling, is fetched from a reserved memory location of memory array 102 and sent to storage unit 136. Subsequently, write scrambling circuit 124, read scrambling circuit 126 or address scrambling circuit 134 generates a scrambling pattern in response to a corresponding scrambling configuration provided by storage unit 136. As discussed above, scrambling configuration is essential for write scrambling circuit 124, read scrambling circuit 126 and address scrambling circuit 134 to operate normally. Eligible users may access memory array 102 successfully by communicating the scrambling configuration. In some embodiments, scrambling configurations are obtained from other devices external to memory device 100, and then stored in the reserved memory location of memory array 102 after an access operation for later use. In some embodiments, the location for storing the scrambling configurations may be adjusted, and any suitable signaling mechanism to inform that location of the memory location is within the contemplated scope of the present disclosure.

In addition, careful disposition of the scrambling configurations may further strengthen the scrambling mechanism. As discussed previously, in some embodiments, the scrambling configuration may be stored in, for example, a reserved memory location of memory array 102. In some embodiments, the scrambling configuration is kept external to memory device 100 and is maintained in an external controller. The scrambling configuration would be loaded from the external controller to storage unit 136 at the time when the access operation is activated. Alternatively, even though the scrambling configuration is stored for use by an access operation, it may be erased from the reserved memory location upon completion of the access operation. Accordingly, the user may need to acquire a scrambling configuration through an external controller while executing a next access operation. In that case, it is more difficult for an unauthorized party to collect the memory data in memory array 102 by guessing scrambling pattern. Hence, the data security is further enhanced.

Figure 2A:
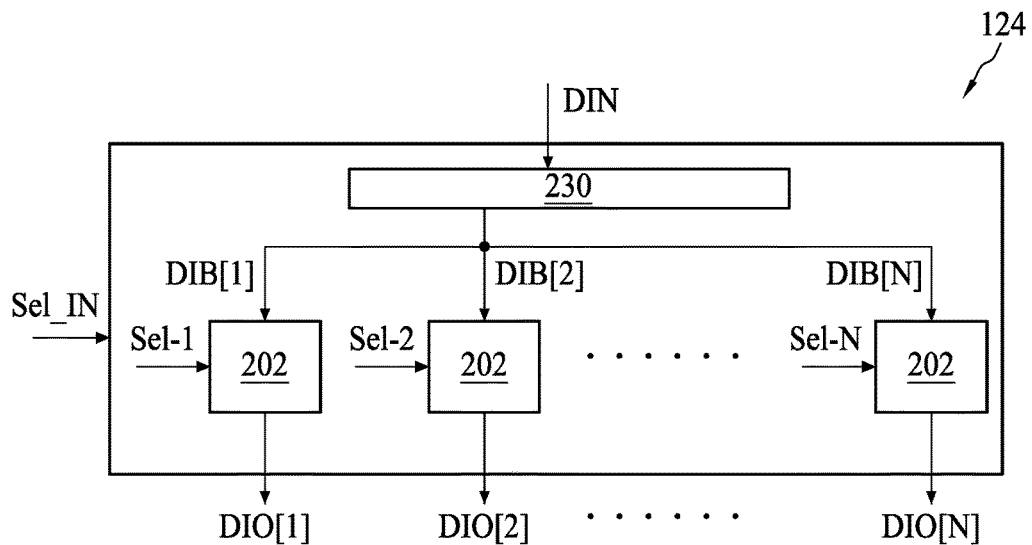
FIG. 2A is a schematic diagram of a write scrambling circuit of the memory device in FIG. 1, in accordance with some embodiments.

FIG. 2A is a schematic diagram of write scrambling circuit 124 of memory device 100, in accordance with some embodiments. Write scrambling circuit 124 is configured to provide scrambled data in response to an input data DIN. Referring to FIG. 2A, write scrambling circuit 124 comprises a data buffer 230 and a plurality of multiplexers 202. Data buffer 230 is configured to form a data block DIB with a block size of N bits by collecting input data bits of the serial input data DIN. Furthermore, multiplexers 202 are configured by a write scrambling configuration Sel_IN to scramble the data block DIB. Each multiplexer 202 includes an input port connected to data buffer 230, and a select port Sel-i configured to select one of the N data bits in data block DIB based on the write scrambling configuration Sel_IN. When all multiplexers 202 complete the bit selection, scrambled data in the sequence of DIO={DIO[1], DIO[2], . . . , DIO[N]} is generated, sent to write drivers 116, and then written to memory group {DIG[1], DIG[2], . . . , DIG[N]}, respectively, of memory array 102.

Figure 2B:
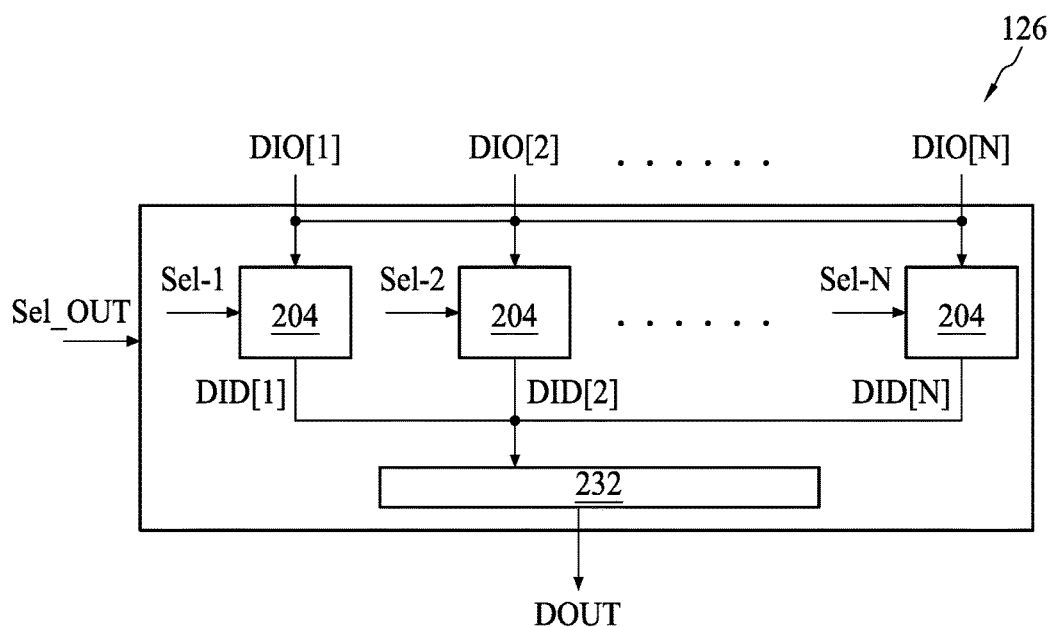
FIG. 2B is a schematic diagram of a read scrambling circuit of the memory device in FIG. 1, in accordance with some embodiments.

FIG. 2B is a schematic diagram of read scrambling circuit 126 of memory device 100, in accordance with some embodiments. Read scrambling circuit 124 is similar in structure to write scrambling circuit 124, and configured to scramble memory data DIO in a read operation. Referring to FIG. 2B, read scrambling circuit 126 comprises a plurality of multiplexers 204 and a data buffer 232. Multiplexers 204 are configured by a read scrambling configuration Sel_OUT. Each multiplexer 204 includes an input port connected to the outputs of N sense amplifiers 122, and a select port Sel-i configured to select one of the N data bits based on the read scrambling configuration Sel_OUT. When all multiplexers 204 complete the bit selection, scrambled data in the sequence of DID={DID[1], DID[2], . . . , DID[N]} is generated, sent to data buffer 232, and then transformed to serial output data DOUT.

Figure 3:
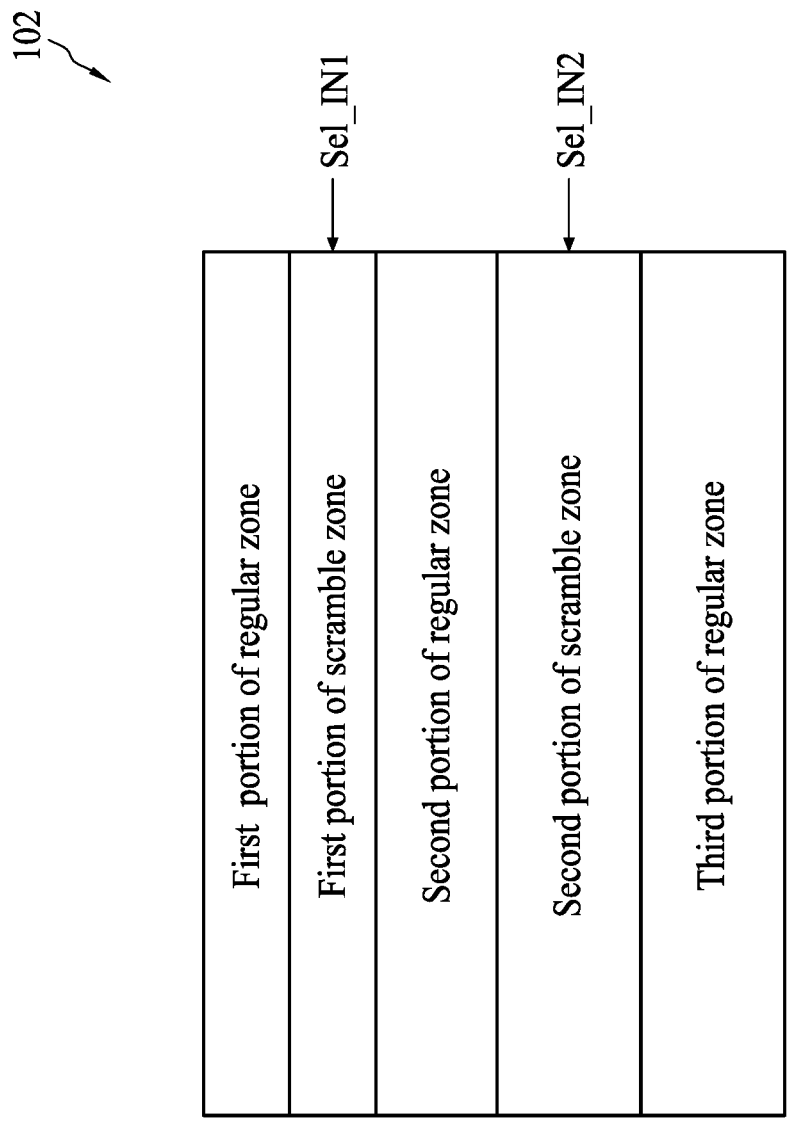
FIG. 3 is a schematic diagram of a memory array in accordance with some embodiments.

FIG. 3 is a diagram of memory array 102 in accordance with some embodiments. Referring to FIG. 3, memory 102 is partitioned in a manner that each row is addressed by address decoder 112. In addition, memory array 102 is configured to store data blocks in two different zones. The first zone, called a regular zone, is configured to store data blocks in their original sequence without data scrambling performed thereto. The second zone, called a scramble zone, is configured to store scrambled data. Moreover, either the regular zone or the scramble zone may be further partitioned into non-contiguous portions. For example, the regular zone is partitioned into a first portion and a second portion. Similarly, the scramble zone is segmented into a first portion, a second portion and a third portion.

When address scrambling circuit 134 is disabled, that means the order of consecutive data blocks DIB stored in memory array 102 is kept the same as the input data DIN. As shown in FIG. 3, the first portion of the scramble zone is disposed between the first portion of the regular zone and the second portion of the regular zone. Moreover, the second portion of the scramble zone is disposed between the second portion of the regular zone and the third portion of the regular zone. In addition, data in each portion of the scramble zone can be scrambled with different scrambling codes. Furthermore, the first portion of the scramble zone comprises a first scramble data set of input data DIN. Similarly, the second portion of the scramble zone comprises a second scramble data set. Although the bits within each data block DIB of the first scramble data set and the second scramble data set are scrambled on a block basis, data in each portion of the scramble zone is interweaved with neither another portion in the scramble zone nor any portion in the regular zone. With such a partial write scrambling mechanism, an unauthorized party may encounter more obstacles in resolving the genuine scrambling patterns.

In addition, still referring to FIG. 3, when address scrambling circuit 134 is incorporated, the physical rows of each data block DIB are further rearranged by the address scrambling pattern as discussed previously. The zone partition illustrated in FIG. 3 under the row scrambling is thus a logical presentation only. In that case, any portion of the regular zone may be interweaved with any portion of the scramble zone block by block (row by row).

In an embodiment, when data to be scrambled and stored in memory array 102 is a unified scrambling code, information on indices of specific data blocks may be omitted. In another embodiment, when a regular zone is configured in a write operation or a scramble zone further comprises multiple portions, the scrambling configuration may comprise a block index with a respective scrambling code. For example, referring to FIG. 3, the write scrambling configurations may be managed for the first data set and the second data set of input data DIN separately. Hence, a first write scrambling configuration Sel_IN1 comprises a first scrambling code and a first range (or a set of block indices) of the first data set for the first portion of the scramble zone. Similarly, a second write scrambling configuration Sel_IN2 comprises a second scrambling code and a second range of the second data set for the second portion of the scramble zone. The row addresses corresponding to the first scramble data set or the second scramble data set are determined separately.

Figure 4:
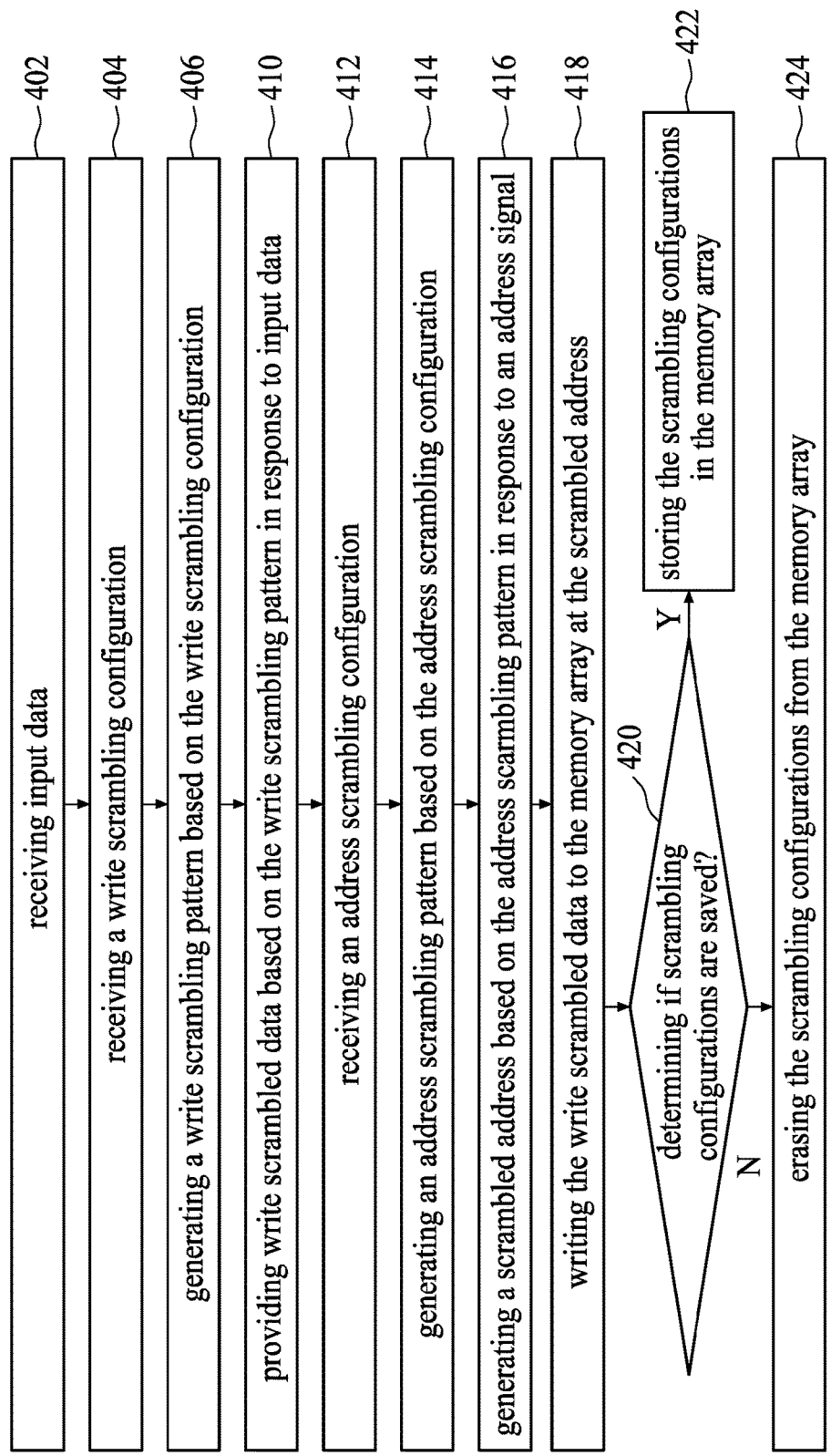
FIG. 4 is a flow diagram of a write operation for a memory device in accordance with some embodiments.

FIG. 4 is a flow diagram of a write operation for memory device 100 in accordance with some embodiments. In operation 402, input data is received for memory device 100. In operation 404, a write scrambling configuration is received. In an embodiment, the write scrambling configuration is read out and accessed from storage unit 136 for a write operation. In another embodiment, the write scrambling configuration has been stored in a reserved memory location for later use. In yet another embodiment, the write scrambling configuration is provided by an external processor.

Subsequently, in operation 406, a write scrambling pattern based on the write scrambling configuration is generated. The write scrambling pattern is generated by data pattern generation circuit 130. Then, in response to input data, write scrambled data is provided based on the writhe scrambling pattern in operation 410.

In operation 412, an address scrambling configuration is received. In operation 414, based on the address scrambling configuration, an address scrambling pattern is generated by address pattern generation circuit 132. Furthermore, a scrambled address signal is generated based on the address scrambling pattern in response to an address signal in operation 416.

In operation 418, the write scrambled data is written to memory array 102 at the scrambled address.

In operation 420, it is determined if the scrambling configurations are saved or not. If affirmative, the scrambling configurations, including the write scrambling configuration and the address scrambling configuration, are stored in the reserved memory location of memory array 102 in operation 422.

If it is determined not to save the scrambling configurations, in operation 424, the scrambling configurations are erased or reset from the memory array 102.

Figure 5:
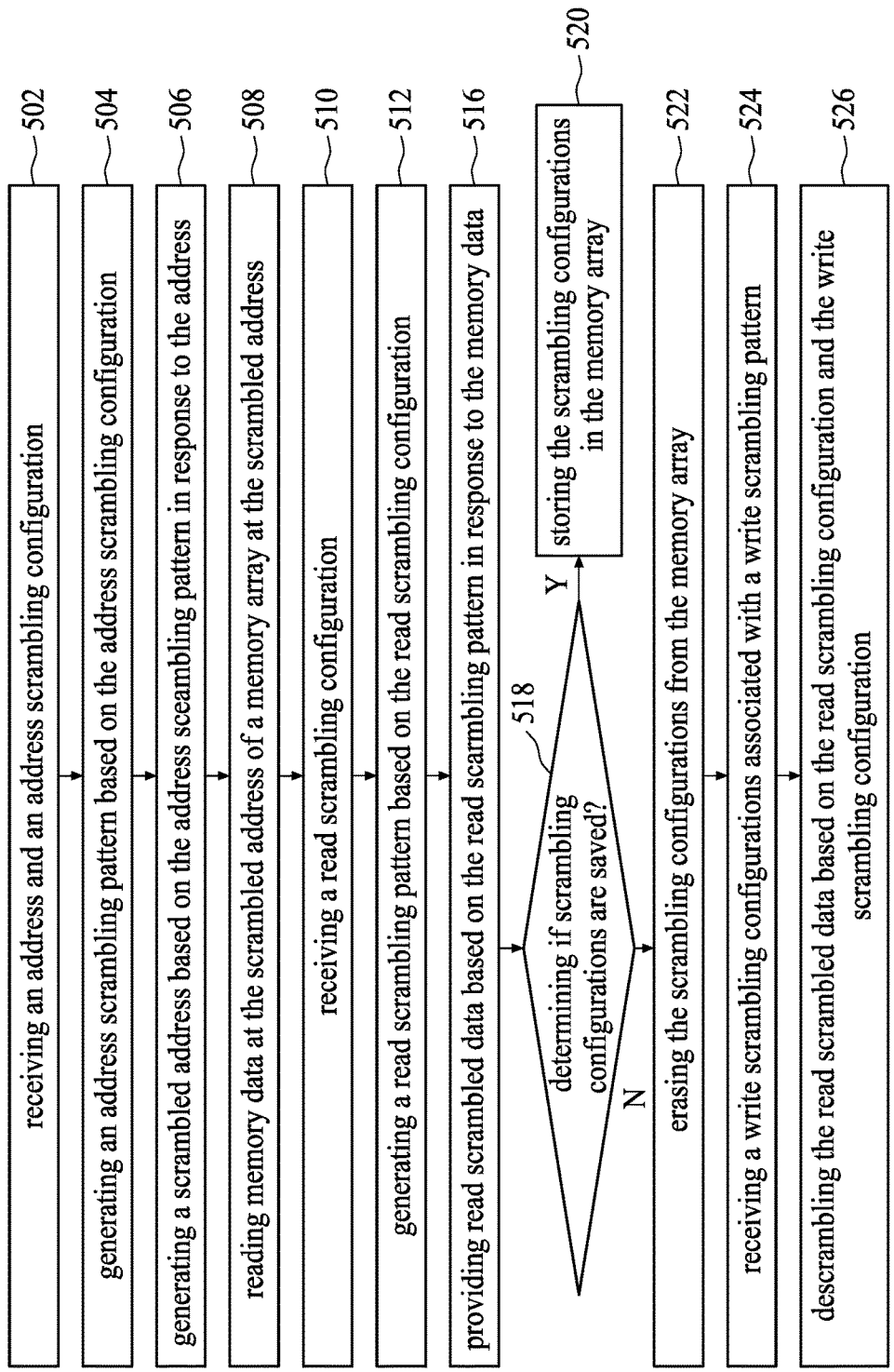
FIG. 5 is a flow diagram of a read operation for a memory array in accordance with some embodiments.

FIG. 5 is a flow diagram of a read operation for memory array 102 in accordance with some embodiments. In operation 501, a memory data is written to memory array 102. Operation 501 is similar to operation 418 illustrated in FIG. 4 where a write operation is performed. In operation 502, a first address signal and an address scrambling configuration are received.

In operation 504, an address scrambling pattern based on the address scrambling configuration is generated. Then, in operation 506, a scrambled address is generated based on the address scrambling configuration in response to the address signal.

In operation 508, memory data of memory array 102 is read out at a read address. In an embodiment, the read address is the first address free from scrambling. In another embodiment, read address is the scrambled address generated in operation 506. Then, in operation 510, a read scrambling configuration is received. In an embodiment, the read scrambling configuration is read out from a reserved memory location of memory 102 and accessed through storage unit 136. In another embodiment, the read scrambling configuration is provided by an external processor.

In operation 512, a read scrambling pattern based on the read scrambling configuration is generated. Then, read scrambled data is provided based on the read scrambling pattern in response to the memory data in operation 516.

In operation 518, it is determined if scrambling configurations, including the read scrambling configuration and the address scrambling configuration, are saved or not. If affirmative, the scrambling configurations are stored in the memory array in operation 520.

If it is determined not to save the scrambling information, in operation 522, the scrambling configurations and the address scrambling configurations are erased from the memory array.

In operation 524, a write scrambling configuration associated with a write scrambling pattern is received. The write scrambling configuration is used for providing the memory data present in memory array 102. Then, in operation 526, the read scrambled data is de-scrambled based on information on the read scrambling configuration and the write scrambling configuration. Hence, the input data is recovered to its original sequence via a reverse operation against the respective read scrambling pattern and write scrambling pattern.

Figure 6:
FIG. 6 is a flow diagram of a write operation for a memory array in accordance with some embodiments.

FIG. 6 is a flow diagram of a write operation for memory array 102 in accordance with some embodiments. In operation 602, input data having a first portion and a second portion is received.

In operation 604, a first write scrambling configuration is received. In an embodiment, the first write scrambling configuration is accessible from storage unit 136. In another embodiment, the first write scrambling configuration is provided by an external processor. Then, in operation 606, a first address is received.

In operation 608, a first scrambling pattern based on the first write scrambling configuration is generated. Then, in operation 612, first write scrambled data is provided based on the first scrambling pattern in response to the first portion of the input data.

In operation 614, the first write scrambled data is written to the memory array 102 at the first address.

In an embodiment, the first address is a scrambled address. In that case, an address scrambling configuration comprising an address scrambling configuration is received. Then, an address scrambling pattern based on the address scrambling configuration is generated. As a result, the scrambled address is generated based on the address scrambling pattern in response to the first address.

In operation 616, a second write scrambling configuration is received from memory array 102. Then, in operation 618, a second address of memory array 102 is received. Also, in operation 620, a second scrambling pattern based on the second write scrambling configuration is generated.

In operation 624, second write scrambled data is provided based on the second scrambling pattern in response to the second portion of input data. In operation 626, the second write scrambled data is written to memory array 102 at the second address.

Then, the scrambling configurations such as the first write scrambling configuration and the second scrambling configuration may be processed in a similar way illustrated in operations 518, 520 and 522. For example, the first scrambling configuration and the second scrambling configuration are stored in the memory array after writing the first scrambled data and the second scrambled data. Alternatively, the first scrambling configuration and the second scrambled configuration are erased from the memory array.

In conclusion, configurable data and address scrambling structure are proposed, wherein either data or address signals can be scrambled. Further, the memory data is scrambled not only before the data is stored, but also after the data is read out. Therefore, the scrambling mechanism offers several advantages. For example, any party for manufacturing or testing the memory device may not access the actual scrambling patterns used by his/her customer since the memory device embeds a variety of scrambling patterns available for use. In addition, data security is uplifted with a more dynamic and flexible design by incorporation of a read scrambling circuit. Also, the memory data can be scrambled with respect to several portions of input data with different scrambling patterns and data ranges. Furthermore, the burden of circuit optimization and customization of the memory device is relieved to a great extent from the viewpoint of the memory manufacturer while the requirement of scrambling pattern diversity and confidentiality for customers is increased.

In some embodiments, a memory device is provided which comprises a memory array, a first scrambling circuit and a second scrambling circuit. The first scrambling circuit is configured to provide first scrambled data with a first scrambling pattern in response to input data. The second scrambling circuit is configured to provide second scrambled data with a second scrambling pattern in response to the first scrambled data.

In some embodiments, in a method for operating a memory array, first data from a memory array of the memory device is received. A first scrambling configuration is received. A first scrambling pattern based on the first scrambling configuration is generated. First scrambled data is provided based on the first scrambling pattern in response to the first data.

In some embodiments, in a method is for access a memory array, input data having a first portion and a second portion is received. A first scrambling configuration is received, from a memory array, for the first portion. A first address of the memory array is received. A first scrambling pattern is generated based on the first scrambling configuration. First scrambled data is generated based on the first scrambling pattern in response to the first portion. The first scrambled data is written into the memory array at the first address.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
a memory array configured to store a first scrambling configuration comprising an index of a data block in input data;
a first scrambling circuit coupled to the memory array and configured to provide first scrambled data with a first scrambling pattern in response to the input data and the first scrambling configuration and store the first scrambled data into the memory array, the first scrambling configuration causing the first scrambled data to comprise a same data content as but a different data sequence from the input data;
a second scrambling circuit coupled to the memory array and configured to provide second scrambled data with a second scrambling pattern in response to the first scrambled data in the memory array;
a storage unit coupled to the first scrambling circuit and the second scrambling circuit and configured to store the first scrambling configuration from the memory array when an access operation is activated, and
a first pattern generation circuit configured to provide the first scrambling pattern and the second scrambling pattern based on the first scrambling configuration and a second scrambling configuration, respectively.

2. The memory device according to claim 1, wherein the first scrambling configuration further comprises a first scrambling code.

3. The memory device according to claim 1, wherein the second scrambling configuration is stored in the memory array when the access operation is activated.

4. The memory device according to claim 1, wherein the first scrambling configuration and the second scrambling configuration are erased from the memory array after completion of the access operation.

5. The memory device according to claim 1, wherein the storage unit is further configured to store the second scrambling configuration, which are available from the memory array in an access operation.

6. The memory device according to claim 1, wherein the first pattern generation circuit comprises a lookup table or a linear feedback shift register.

7. The memory device according to claim 1, wherein the first scrambling circuit comprises:
- a data buffer configured to form the data block in response to the input data; and
- a plurality of multiplexers configured to provide the first scrambled data in response to the data block from the data buffer, each multiplexer selecting one bit from the data block based on the first scrambling configuration.

8. The memory device according to claim 1, further comprising:
- a second pattern generation circuit configured to generate a third scrambling pattern based on a third scrambling configuration; and
- a third scrambling circuit configured to provide a scrambled address, for an access operation, with the third scrambling pattern.

9. The method according to claim 8, wherein the second pattern generation circuit comprises a lookup table or a linear feedback shift register.

10. The method according to claim 1, wherein the second scrambling circuit comprises
- a plurality of multiplexers configured to provide a second data block in response to the first scrambled data in the memory array, each multiplexer selecting one bit from the first scrambled data based on the second scrambling configuration; and
- a data buffer configured to form the second scrambling data in response to the second data block.

11. The method according to claim 10, further comprising a plurality of sense amplifies configured to receive the outputs of the multiplexers in the second scrambling circuit and detect logic states of data read from the memory array.

12. A method for operating a memory array associated with a first scrambling pattern and a second scrambling pattern, the memory array being configured to store a first scrambling configuration and a second scrambling configuration, the method comprising:
- receiving input data;
- storing the first scrambling configuration and the second scrambling configuration from the memory array into a storage unit external to the memory array when the input data is received;
- generating the second scrambling pattern based on the second scrambling configuration;
- providing first data based on the second scrambling pattern in response to the input data;
- writing the first data into the memory array;
- erasing the second scrambling configuration from the memory array after writing the first data;
- generating the first scrambling pattern based on the first scrambling configuration;
- providing first scrambled data based on the first data and the first scrambling pattern in response to a read operation, and
- erasing the first scrambling configuration from the memory array after providing the first scrambled data.

13. The method according to claim 12, further comprising receiving the first scrambling configuration from an external controller prior to storing the first scrambling configuration.

14. The method according to claim 12, further comprising:
- de-scrambling the first scrambled data based on the first scrambling configuration and the second scrambling configuration.

15. The method according to claim 12, wherein the second scrambling configuration included a scrambling code and an index of a data block in the input data.

16. The method according to claim 12, further comprising providing a scrambled address signal for providing the first data or the first scrambled data, in response to an address signal, with a third scrambling pattern based on a third scrambling configuration.

17. A method for accessing a memory array, the memory array being configured to store a first scrambling configuration, the method comprising:
- receiving input data having a first portion and a second portion;
- storing the first scrambling configuration for the first portion from the memory array into a storage unit external to the memory array when the input data is received, the first scrambling configuration comprising a first scrambling code and an index of a data block in the first portion of the input data;
- receiving a first address of the memory array;
- generating a first scrambling pattern based on the first scrambling configuration;
- providing first scrambled data based on the first scrambling pattern in response to the first portion;
- writing the first scrambled data to the memory array at the first address;
- reading the first scrambled data from the memory array;
- providing second scrambled data based on the first scrambled data and a second scrambling pattern in response to the reading, wherein the second scrambling pattern is generated based on a second scrambling configuration; and
- storing the first scrambling configuration and the second scrambling configuration in the memory array after writing the first scrambled data and the second scrambled data.

18. The method according to claim 17, further comprising:
- receiving a third scrambling configuration for the second portion;
- receiving a second address of the memory array;
- generating a third scrambling pattern based on the third scrambling configuration;
- providing third scrambled data based on the third scrambling configuration in response to the second portion; and
- writing the third scrambled data to the memory array at the second address.

19. The method according to claim 17, further comprising:
- receiving a fourth scrambling configuration;
- generating a fourth scrambling pattern based on the fourth scrambling configuration;
- generating a scrambled address in response to the first address; and
- writing the first scrambled data to the memory array at the scrambled address.

20. The method according to claim 17, further comprising receiving the first scrambling configuration and the second scrambling configuration from an external controller prior to storing the first scrambling configuration and the second scrambling configuration.

\* \* \* \* \*